April 15, 1969     E. A. MILBRANDT     3,438,363
PORTABLE HEATER

Filed May 22, 1967     Sheet 1 of 2

INVENTOR.
ERVIN A. MILBRANDT
BY Irons, Birch, Swindler & McKie

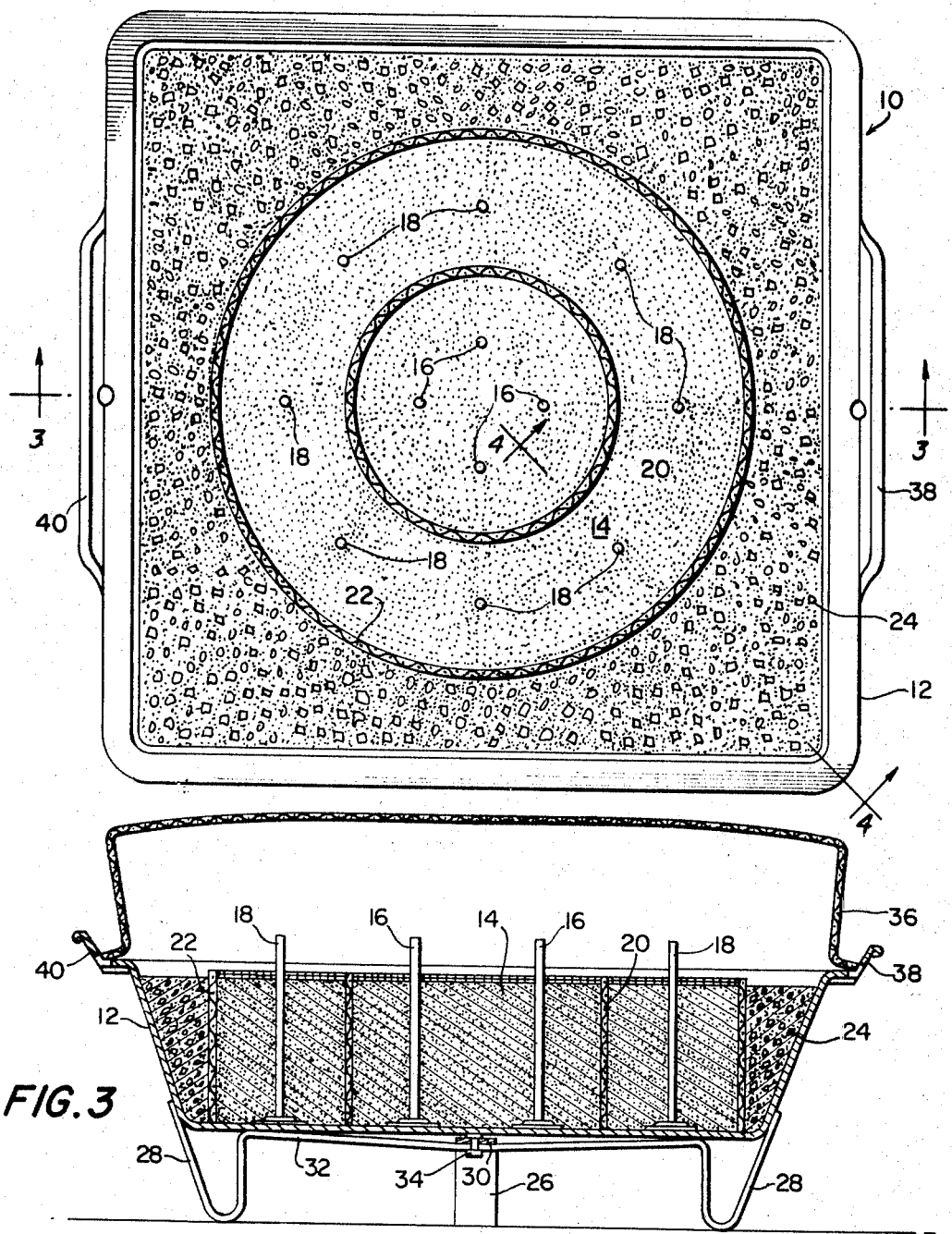

3,438,363
PORTABLE HEATER
Ervin A. Milbrandt, Lisbon, N. Dak., assignor to Lisbon Industries, Inc., Lisbon, N. Dak., a corporation of North Dakota
Filed May 22, 1967, Ser. No. 640,098
Int. Cl. F24c 1/16; A47g 23/04; F23d 3/16
U.S. Cl. 126—9                                   10 Claims

ABSTRACT OF THE DISCLOSURE

A portable heater comprising a container substantially filled with a combustible substance, a plurality of wicks vertically disposed in the substance and a foraminous member interposed between the wicks for controlling the flow of the substance to the wicks to promote uniform consumption of the substance when the wicks are lighted.

BACKGROUND OF THE INVENTION

Field of the invention

This invention relates to portable heaters and more specifically to a portable heater having a plurality of wicks which are fueled from a single source of a combustible substance and which includes means for controlling the flow of the combustible substance to the wicks. The portable heater of the invention is of a particularly rugged and compact construction and is adapted to be stored for indefinite periods of time in a fully fueled and stable condition, thereby facilitating storage of the heater in a confined space indefinitely prior to use as a source of heat during an emergency condition, such as when a motorist becomes stranded in the open during a blizzard.

Description of the prior art

Portable heaters have long been known as a means for providing campers and other outdoorsmen with a source of heat for cooking and general heating purposes in an outdoor environment. Many of the prior art heaters utilize a liquid fuel such as kerosene or gasoline. Such fuels are volatile and extremely inflammable, and therefore are inpracticable to store in a heater for long periods of time prior to their consumption. Thus, portable heaters which utilize a liquid fuel may not feasibly be carried and stored in a fully fueled condition for indefinite periods of time by motorists, boaters, hunters, campers and other outdoorsmen who may have need for an emergency source of heat. A motorist, for example, would not wish to carry a supply of an inflammable liquid fuel in the trunk of his automobile either in a heater or in a separate container for an indefinite period of time to be used in the event his automobile becomes stranded in the open during severe weather conditions, such as a blizzard or inundating rainstorm.

To overcome the disadvantages of liquid fueled heaters, portable heaters have been devised which utilize as fuel, a solid combustible substance, such as paraffin, which melts when exposed to an ordinary flame. The simplest and perhaps best known heater of this type is the ordinary candle. However, a conventional candle obviously produces only a very limited amount of heat and therefore has minimal utility as an emergency source of heat.

Other solid fueled portable heaters are known which comprise a plurality of wicks as opposed to the single wick of an ordinary candle. Generally, the wicks of such heaters are vertically disposed in a solid combustible substance and when lighted provide a plurality of individual flames. However, the consumption of the combustible substance in such heaters usually is controlled solely by the positioning of the individual wicks. Thus, the substance closely surrounding and fueling one or more of the wicks is usually consumed more quickly than the substance further from the wicks. And, upon continued use, the substance closest to the wicks will be completely consumed causing the flames to extinguish while substantial amounts of the substance remain unconsumed.

SUMMARY OF THE INVENTION

The heater of the present invention employs a solid combustible substance which melts when exposed to an ordinary flame, as fuel, having disposed therein a plurality of vertically extending wicks and includes additional means disposed in the combustible substance and interposed between the wicks for controlling the flow of the substance to the wicks while they are lighted to promote uniform consumption of all of the available fuel. Preferably, the means for controlling the flow of the combustible substance comprises a foraminous member which is interposed between distinct pluralities of the wicks such that each plurality of wicks will primarily consume that portion of the substance which is on the same side of the foraminous member as that particular plurality of wicks. The foraminous member also minimizes sloshing of the melted quantity of the combustible substance when the heater is moved about while the wicks are lighted.

In addition, particles of a noncombustible particulate material may be disposed in the combustible substance outside of the immediate area of all of the wicks to impart solidity to the outer portion of the substance which further minimizes sloshing, and encourages an inward flow of the substance as it is melted.

Thus, the heater of the present invention not only overcomes the disadvantages of liquid fueled heaters with respect to the hazardous and burdensome fuel storage problems associated therewith, but also obviates the undesirable and inefficient fuel consumption problems associated with the prior art multi-wick solid fueled heaters. Furthermore, the heater of the present invention is of a lightweight, rugged and compact construction, and therefore ideally lends itself to storage for long periods of time in the trunk of an automobile, in a boat compartment, or in a knapsack until it is needed to provide an emergency source of heat.

Therefore, it is an object of the present invention to provide a portable heater which may be stored for an indefinite period of time in a fully fueled condition ready for use as an effective and efficient emergency source of heat.

It is a further object of the invention to provide a heater which utilizes as fuel, a solid combustible substance which melts when exposed to an ordinary flame, and which includes means disposed in the substance to promote uniform consumption thereof by a plurality of wicks.

It is an additional object of the present invention to provide a portable heater which is fueled by a solid combustible substance which melts when exposed to an ordinary flame, and which includes a foraminous member disposed in the substance and interposed between distinct pluralities of wicks for controlling the flow of the substance to the wicks to promote uniform consumption of the substance.

It is also an object of the present invention to provide a portable heater which is of a lightweight, rugged and compact construction and which may be stored for an indefinite period of time in a fully fueled condition ready for use as an emergency source of heat by motorists, boaters, hunters, campers and other outdoorsmen.

With the foregoing summary of the invention in mind, a preferred embodiment of the invention is hereinafter described in connection with the following drawings.

BRIEF DESCRIPTION OF THE DRAWINGS

FIG. 2 is a plan view of the heater shown in FIG. 1 with the grill removed;

FIG. 3 is a cross-sectional view taken on line 3—3 of FIG. 2;

DESCRIPTION OF THE PREFERRED EMBODIMENT

Figure 1:
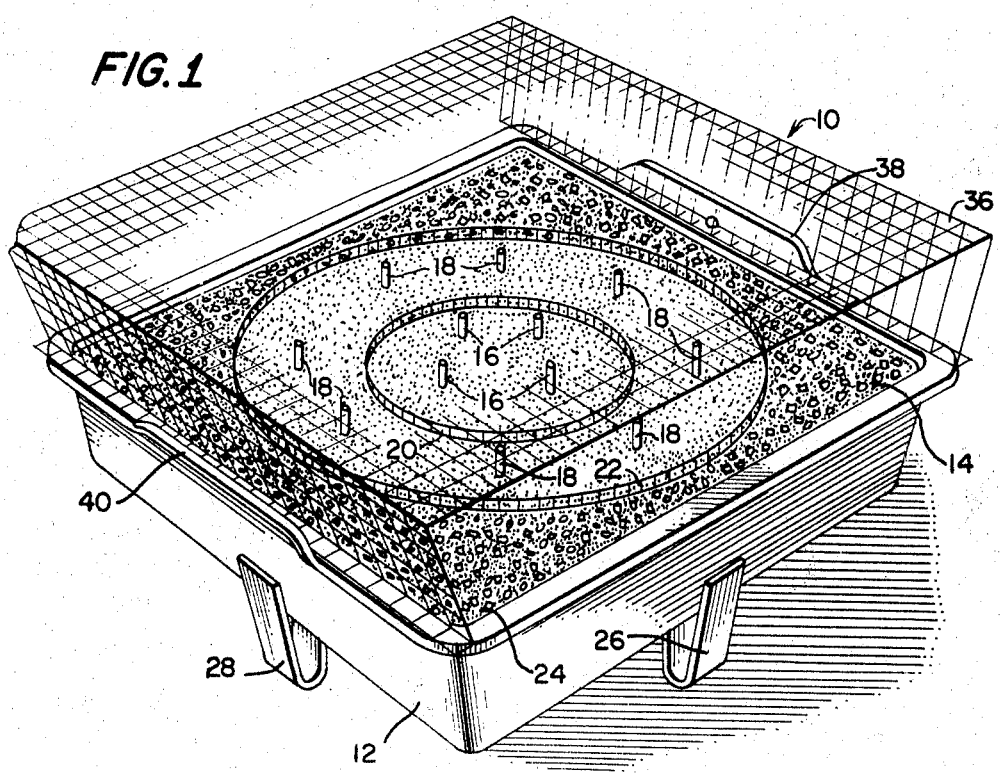
FIG. 1 is a perspective view of a preferred embodiment of the portable heater of the present invention.

A preferred embodiment 10 of the portable heater of the invention is shown in FIG. 1. Heater 10 comprises a container 12 which is substantially filled with a combustible substance 14. Substance 14 preferably is a solid combustible hydrocarbon substance which melts when exposed to the heat of an ordinary flame, such as paraffin.

Vertically disposed in substance 14 and extending upwardly beyond the upper surface thereof are a first plurality of wicks 16. Surrounding wicks 16 are a second plurality of wicks 18, also vertically disposed in substance 14 and extending upwardly beyond the upper surface thereof. As will be apparent, pluralities of wicks 16 and 18 when lighted will provide a plurality of individual flames which are fueled by substance 14.

Also disposed in substance 14 and interposed between wicks 16 and 18 is a foraminous member 20 which may be a piece of galvanized screen wire formed in the shape of a circle surrounding wicks 16. When wicks 16 and 18 are lighted, foraminous member 20 controls the flow of substance 14 as it is melted by the individual flames burning at the wicks.

More particularly, foraminous member 20 restricts the flow of the portion of substance 14, which is outside of member 20, inwardly toward wicks 16, wicks 16 being positioned interiorly of the member, and promotes the consumption by wicks 16 of the portion of substance 14 which is within member 20. Similarly, member 20 restricts the flow of the portion of substance 14, which is inside of the member, outwardly toward wicks 18, wicks 18 being positioned exteriorly of member 20, and promotes the consumption by wicks 18 of the portion of substance 14 which is outside of the member. Foraminous member 20 thus insures that substance 14 will be substantially uniformly consumed by wicks 16 and 18, and that the fuel adjacent any one or more of the wicks will not be entirely consumed before the fuel adjacent all of the wicks has been consumed.

Foraminous member 20 also minimizes undesirable sloshing and splashing of the melted quantity of substance 14 when heater 10 is moved about while wicks 16 and 18 are ignited. Further, by utilizing a foraminous member as opposed to an imperforate sheet to control the flow of melted substance 14 to wicks 16 and 18, the desired flow restriction may be achieved without impairing the circulation of air to the wicks which is necessary for efficient combustion of the substance.

Surrounding wicks 18 and disposed in substance 14 is a second foraminous member 22 which also may be a piece of galvanized screen wire formed in the shape of a circle. Dispersed in substance 14 outside of member 22 are particles of a noncombustible particulate material 24, such as a micaceous or pumiceous material, for example, vermiculite or pumice. Particles 24 impart solidity to the portion of substance 14 which is outside of member 22 and thereby reduce sloshing and splashing of any melted quantity of that portion of the substance. Further, due to the solidity imparted to the portion of substance 14 which is outside of member 22, the flow of substance outwardly from member 22 is restricted and the flow of substance inwardly from the member toward wicks 18 is promoted. Also, particles 24 serve as a means for supporting member 22 as substance 14 is progressively melted and consumed.

Particles 24 may be dispersed substantially uniformly throughout the portion of substance 14 which is outside of member 22, as shown in the drawings, or the particles may be dispersed only in the upper strata of that portion of the substance. In the course of making heater 10, particles 24 normally are placed into container 12 before substance 14 in a melted state is poured therein, and depending upon whether the specific gravity of the particulate material is substantially equal to or less than the specific gravity of the melted substance, the particles will either disperse substantially uniformly throughout the substance or float to the upper strata thereof. However, irrespective of whether the specific gravity of the particulate material selected is substantially equal to or less than the specific gravity of the melted substance, the above-described benefits inuring from the employment of particles of such material will be realized.

The primary functions of foraminous member 22 are to further minimize sloshing and splashing of the melted quantity of substance 14, and to prevent particles 24 from moving into the burning area around wicks 16 and 18. Member 22 also restricts the flow of substance 14 outwardly away from wicks 16 and 18, and thus promotes the maintenance of substance 14 in the burning area.

As will be apparent from the foregoing description, when wicks 16 and 18 are lighted, that portion of substance 14 adjacent each of the pluralities of wicks will be substantially uniformly consumed and all of the wicks will burn for a substantially equal amount of time before all of substance 14 within member 22 is consumed. Further, a substantial amount of that portion of substance 14 which is outside of member 22 will melt and flow downwardly and inwardly toward the burning area before all of the substance originally within member 22 is consumed. Thus, the maximum amount of heat will be generated by heater 10 as long as any appreciable amount of substance 14 remains unconsumed.

Further, it will be apparent that by utilizing a circular container instead of a square or rectangular container, such as container 12, in combination with circular patterns of wicks, such as pluralities of wicks 16 and 18, substantially all of the combustible substance will be consumed before any of the flames extinguish. Similarly, by utilizing square or rectangular patterns of wicks instead of circular patterns of wicks, such as pluralities of wicks 16 and 18, in combination with a square or rectangular container, such as container 12, substantially all of the combustible substance will be consumed before any of the flames extinguish. The particular combination of a square container and circular wick patterns has been specifically disclosed merely to illustrate the variety of container shapes and wick patterns which may be successfully employed in the heater of the invention.

Heater 10 may include supporting means, such as pairs of legs 26 and 28, for positioning container 12 above a surface on which the heater is placed. Legs 26 are formed at the extremities of a first cross piece 30, and legs 28 are formed at the extremities of a second cross piece 32. Pieces 30 and 32 may be pivotally connected at their respective central portions by a connector 34.

Figure 4:
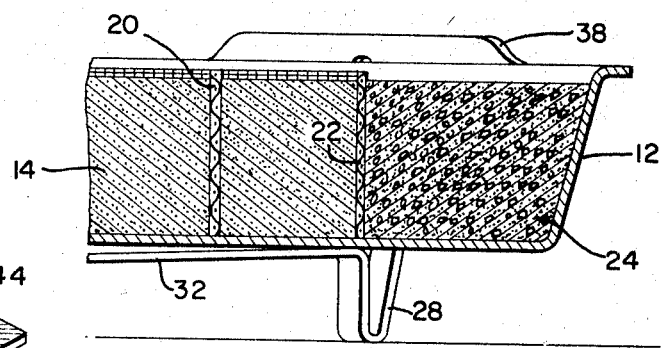
FIG. 4 is a cross-sectional view taken on line 4—4 of FIG. 2.

Thus, when a user desires to use heater 10, he pivots pieces 30 and 32 with respect to each other until they have assumed a substantially perpendicular attitude, container 12 may then be placed thereon and legs 26 and 28 will position the container above the surface on which the legs are resting, as shown in FIGS. 1, 3 and 4. Conversely, to facilitate storage and shipment of the heater, cross pieces 30 and 32 may be folded together and placed on top of the upper surface of substance 14 within container 12.

In addition, heater 10 may include a grill 36 which is positioned over substance 14 and wicks 16 and 18 by engagement with flanges 38 and 40 on opposite upper edges of container 12. Grill 36 may be a piece of appropriately formed screen wire and provides a guard above the flames burning at wicks 16 and 18 when the wicks are lighted, and a means for supporting items, such as a pan of water or can of food, above the flames to be heated. For purposes of storage and shipment, grill 36 may be disengaged from flanges 38 and 40 and nestably positioned beneath container 12.

Figure 5:
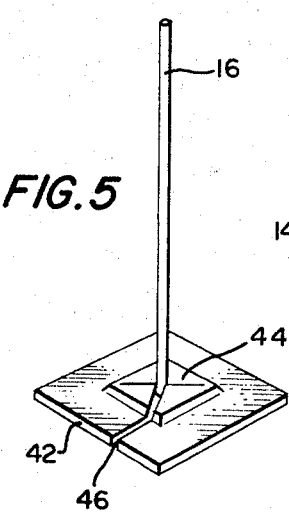
FIG. 5 is a perspective view of one of the wicks utilized in the heater shown in FIG. 1 including the wick securing means.

Means are also provided for positionally securing wicks 16 and 18 in their proper locations within heater 10 to prevent the wicks from being removed from the heater and to hold the wicks in place while substance 14 in a melted state initially is poured into container 12. One of the wick securing means is shown in FIG. 5 engaging the lower end of one of the wicks 16. The securing means comprises a thin gauge metallic plate 42 having a raised central portion 44 with perpendicular bisecting cuts formed therein, only one of which is shown in FIG. 5. A slot 46 may be formed from the edge of plate 42 to the center thereof for receiving the lower end of wick 16 and guiding it to the center of the plate. Alternatively, the wick may be inserted directly into an opening through the center of plate 42 formed by slightly raising the triangular flanges defined by the cuts which bisect central portion 44. After the lower end of the wick has been inserted through or guided to the center of the plate, the triangular flanges are forced against the wick to firmly hold it in place.

The lower end of each of wicks 16 and 18 is engaged by a similar wick securing means and all of the securing means are then affixed to the bottom of container 12 by any convenient method, such as by gluing, soldering or by mechanical attachment. Alternatively, the plates 42 of the wick securing means may be affixed to a separate piece of screen wire or similar material (not shown) of substantially the same size and shape as the bottom of container 12. The piece of screen wire is then placed on the container bottom to position the wicks in their proper locations.

The method of making heater 10 will be obvious to those skilled in the art from the foregoing description. Foraminous members 20 and 22, particles 24 and wicks 16 and 18 are positioned appropriately within container 12 before substance 14 in a melted state is poured therein. Particles 24 are placed only on the outside of member 22 and become dispersed in that portion of the container as the substance is poured therein. Wicks 16 and 18 are held in their proper locations by the wick securing means which are affixed either directly to the bottom of container 12 or to a separate piece of screen wire which is placed on the bottom. After the container has been substantially filled with substance 14, the substance is permitted to cool and solidify. The heater is then ready for use.

As will be evident, heater 10 comprises a solid fueled portable heater which may be stored for an indefinite period of time in a fully fueled condition ready for use. Further, due to the flow restricting function of member 20, and to a lesser extent member 22 and particles 24, substance 14 will be consumed by wicks 16 and 18 substantially uniformly to maximize the heat generation and burning time of the heater. Heater 10 thus provides an ideal source of emergency heat to be carried by motorists, boaters, hunters, campers and other outdoorsmen to be used in the event of an emergency condition, such as becoming stranded in the open during severe weather conditions.

The foregoing description of a preferred embodiment of the invention is to be understood as illustrative only and in no way limiting of the scope thereof. The invention is to be limited solely by the scope of the appended claims.

I claim:

1. An article of manufacture comprising;
    a container substantially filled with a solid combustible substance which melts when exposed to an ordinary flame;
    first and second pluralities of wicks vertically disposed in said substance and extending upwardly beyond the upper surface thereof, said first and second pluralities of wicks, when lighted, providing a plurality of individual flames fueled by the substance; and
    a foraminous member disposed in the substance and interposed between said first and second pluralities of wicks for controlling the flow of the substance to the wicks to thereby promote uniform consumption of the substance.

2. An article of manufacture as recited in claim 1 further comprising;
    means engaging the lower end of each of said plurality of wicks for positionally securing said wicks within said container.

3. An article of manufacture as recited in claim 1 further comprising;
    means engaging the bottom of said container for supporting said container above any surface on which said article may be placed.

4. An article of manufacture as recited in claim 3 wherein said means for supporting said container is detachable therefrom and storable therein to facilitate storage and shipment of said article.

5. An article of manufacture as recited in claim 1 further comprising;
    a grill engaging the top of said container and extending over said substance to provide a guard above said plurality of individual flames and a means for supporting items to be heated over said flames.

6. An article of manufacture as recited in claim 5, wherein said grill is detachable from said container and nestable therebeneath to facilitate storage and shipment of said article.

7. An article of manufacture as recited in claim 1, wherein said combustible substance is paraffin.

8. An article of manufacture comprising;
    a container substantially filled with a solid combustible substance which melts when exposed to an ordinary flame;
    a first plurality of wicks vertically disposed in the central portion of said substance and extending upwardly beyond the upper surface thereof;
    a second plurality of wicks vertically disposed in said substance and extending upwardly beyond the upper surface thereof, said second plurality of wicks being spaced outwardly from and surrounding said first plurality of wicks, said first and second pluralities of wicks, when lighted, providing a plurality of individual flames fueled by the substance;
    a first foraminous member disposed in said substance and interposed between said first and second pluralities of wicks for controlling the flow of the substance to the wicks to thereby promote uniform consumption of the substance;
    a second foraminous member disposed in said substance and surrounding said second plurality of wicks; and
    particles of an incombustible particulate material dispersed in the portion of the substance surrounding said second foraminous member, said second foraminous member and said particles further controlling the flow of the substance to the wicks.

9. An article of manufacture as recited in claim 8, wherein the specific gravity of said particulate material is less than the specific gravity of said combustible substance.

10. An article of manufacture as recited in claim 9, wherein said combustible substance is paraffin and said particulate material is vermiculite.

(References on following page)

References Cited

UNITED STATES PATENTS

| | | | |
|---|---|---|---|
| 2,533,290 | 12/1950 | Shaw | 67—22 |
| 2,985,164 | 5/1961 | Imoto | 126—9 X |
| 3,338,691 | 8/1967 | Knowles et al. | 67—22 X |

FOREIGN PATENTS

| | | |
|---|---|---|
| 15,057 | 1890 | Great Britain. |
| 80,804 | 6/1920 | Austria. |

CHARLES J. MYHRE, *Primary Examiner.*

U.S. Cl. X.R.

126—261; 431—291